(12) United States Patent
Chen et al.

(10) Patent No.: US 11,391,988 B2
(45) Date of Patent: Jul. 19, 2022

(54) LIGHT SOURCE MODULE, BACKLIGHT MODULE AND DISPLAY DEVICE

(71) Applicants: Radiant Opto-Electronics (Suzhou) Co., Ltd., Jiangsu (CN); Radiant Opto-Electronics Corporation, Kaohsiung (TW)

(72) Inventors: Chang-Yao Chen, Kaohsiung (TW); Chih-Chiang Chang, Kaohsiung (TW); Ya-Yin Tsai, Kaohsiung (TW)

(73) Assignees: Radiant Opto-Electronics (Suzhou) Co., Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 17/234,821

(22) Filed: Apr. 20, 2021

(65) Prior Publication Data
US 2021/0263380 A1    Aug. 26, 2021

Related U.S. Application Data

(63) Continuation of application No. PCT/CN2019/127062, filed on Dec. 20, 2019.

(51) Int. Cl.
G02F 1/13357    (2006.01)

(52) U.S. Cl.
CPC ............... *G02F 1/133608* (2013.01)

(58) Field of Classification Search
None
See application file for complete search history.

(56) References Cited

U.S. PATENT DOCUMENTS

| 2014/0160733 | A1* | 6/2014 | Ono | F21K 9/60 |
| | | | | 362/97.1 |
| 2015/0234232 | A1* | 8/2015 | Lam | G02F 1/133603 |
| | | | | 349/42 |
| 2016/0161086 | A1* | 6/2016 | Kang | F21V 7/04 |
| | | | | 362/235 |
| 2018/0004042 | A1* | 1/2018 | Yu | G02F 1/133605 |

(Continued)

FOREIGN PATENT DOCUMENTS

| CN | 203731204 U | * | 7/2014 |
| CN | 204576025 U |   | 8/2015 |

(Continued)

*Primary Examiner* — Britt D Hanley
(74) *Attorney, Agent, or Firm* — CKC & Partners Co., LLC

(57) ABSTRACT

A light source module includes a back plate and light-emitting units. The back plate includes a bottom plate and a sidewall. An included angle is formed between an outer side surface of the sidewall and a horizontal plane where the bottom plate is located, and the included angle is an acute angle. An optical distance is defined between a top end of the sidewall and the horizontal plane. The light-emitting units are arranged in the back plate. The light-emitting units which are closest to the sidewall are defined as target light-emitting units, and each of the target light-emitting units has a radiation angle, and each of the target light-emitting units is separated from the sidewall by a distance. The first horizontal distance is determined by a tangent function of a complementary angle of the radiation angle, the second horizontal distance is determined by a tangent function of the included angle.

12 Claims, 6 Drawing Sheets

(56) References Cited

U.S. PATENT DOCUMENTS

2019/0278013 A1 9/2019 Huang
2019/0331965 A1 10/2019 Xiao

FOREIGN PATENT DOCUMENTS

| CN | 106371245 A | 2/2017 |
| CN | 208297889 U | 12/2018 |
| CN | 208521027 U | 2/2019 |
| TW | 200812102 A | 3/2008 |
| TW | M437967 U | 9/2012 |

* cited by examiner

LIGHT SOURCE MODULE, BACKLIGHT MODULE AND DISPLAY DEVICE

RELATED APPLICATIONS

This application is a continuation application of International Application No. PCT/CN2019/127062 filed on Dec. 20, 2019, which is incorporated herein by reference.

BACKGROUND

Field of Invention

The present disclosure relates to a light source module. More particularly, the present disclosure relates to a light source module having improved luminance uniformity and its applications to a backlight module and a display device.

Description of Related Art

Generally, a light source module which is used for a direct type backlight module includes a substrate and plural light-emitting units arranged on the substrate at equal intervals. Light generated by the light-emitting units can be further mixed by an optical film to form a surface light source.

In order to reduce the cost and weight of the overall light source module, usually the number of light-emitting units is reduced. However, if the light-emitting units near a sidewall of a backplate are disposed too far from the sidewall, light generated by the light-emitting unit cannot be efficiently reflected by sidewall of the backplate, which causes dark shadow formed on a light-emitting surface near the edge of the sidewall. On the contrary, if the number of the light-emitting units is increased to solve the problem of dark shadow formed on the edges or corners of the sidewall, this will increase the weight and cost of the overall light source module.

SUMMARY

The invention provides a light source module which has good luminance uniformity, thereby improving the overall optical taste of a backlight module and a display device.

According to the aforementioned object, a light source module is provided. The light source module includes a back plate and plural light-emitting units. The back plate includes a bottom plate and a sidewall standing on the bottom plate, in which an included angle ($\theta_{slope}$) is formed between an outer side surface of the sidewall and a horizontal plane where the bottom plate is located, and the included angle is an acute angle, and an optical distance (OD) is defined between a top end of the sidewall and the horizontal plane. The light-emitting units are arranged in the back plate, in which the light-emitting units which are closest to the sidewall are defined as plural target light-emitting units, and each of the target light-emitting units has a radiation angle ($\theta_{LED}$), and each of the target light-emitting units is separated from the sidewall by a distance (d). The distance (d) is a difference between a first horizontal distance and a second horizontal distance, and the first horizontal distance is formed between each of the target light-emitting units and a predetermined location of the sidewall, and the second horizontal distance is formed between a bottom edge of the sidewall and the predetermined location of the sidewall. The first horizontal distance is calculated according to a first function F1, and the first function F1 is determined by a tangent function of a complementary angle of the radiation angle ($\theta_{LED}$), the second horizontal distance is calculated according to a second function F2, and the second function F2 is determined by a tangent function of the included angle ($\theta_{slope}$).

According to an embodiment of the present invention, the aforementioned radiation angle ($\theta_{LED}$) is a half viewing angle or a half light-intensity angle of each of the target light-emitting units, and light emitted by each of the target light-emitting units at the radiation angle ($\theta_{LED}$) is directed to the predetermined location of the sidewall.

According to an embodiment of the present invention, a portion of a surface of the sidewall which ranges from the predetermined location to a top edge of the sidewall can reflect more than 50% of light generated by each of the target light-emitting units.

According to an embodiment of the present invention, the aforementioned predetermined location is a midpoint of the sidewall or a position lower than the midpoint of the sidewall to which the light emitted by each of the target light-emitting units at half viewing angle or a half light-intensity angle is able to reach.

According to an embodiment of the present invention, the first function F1 is defined by the following equation:

$$F1 = P \cdot \left( \frac{1}{\tan(90° - \theta_{LED})} \right).$$

The second function F2 is defined by the following equation:

$$F2 = P \cdot \left( \frac{1}{\tan(\theta_{slope})} \right).$$

P represents a vertical distance between the horizontal plane and the predetermined location on the sidewall.

According to an embodiment of the present invention, a vertical distance P between the horizontal plane and the predetermined location on the sidewall is greater than or equal to 20% of the optical distance (OD) and is smaller than or equal to 50% of the optical distance (OD).

According to an embodiment of the present invention, the relationship between the included angle ($\theta_{slope}$) and the radiation angle ($\theta_{LED}$) is defined by an inequality: $(90 - \theta_{LED}) < \theta_{slope} \leq 90$.

According to an embodiment of the present invention, the relationship between the included angle ($\theta_{slope}$) and the radiation angle ($\theta_{LED}$) is defined by an equation:

$$\theta_{slope} = \frac{(180° - \theta_{LED})}{2}.$$

According to an embodiment of the present invention, a distance (D) is calculated by subtracting a third horizontal distance from the difference between the first horizontal distance and the second horizontal distance. The third horizontal distance is a distance between a center and an edge of each of the target light-emitting units, wherein the third horizontal distance is calculated according to a third function F3, and the third function F3 is determined by a tangent function of a complementary angle of the radiation angle ($\theta_{LED}$).

According to an embodiment of the present invention, the first function F3 is defined by the following equation:

$$F3 = \frac{H}{\tan(90° - \theta_{LED})},$$

in which H represents a height of each of the target light-emitting units.

According to an embodiment of the present invention, the relationship among the height (H) of each of the target light-emitting units, the optical distance (OD), the included angle ($\theta_{slope}$) and the radiation angle ($\theta_{LED}$) is defined by an inequality:

$$\left(1 - \frac{2H}{OD}\right) \cdot \frac{\tan(\theta_{slope})}{\tan(90° - \theta_{LED})} > 1.$$

According to an embodiment of the present invention, the relationship among the height (H) of each of the target light-emitting units, the optical distance (OD), the included angle ($\theta_{slope}$) and the radiation angle ($\theta_{LED}$) is defined by an inequality:

$$\left(1 - \frac{2H}{OD}\right) \cdot \frac{\tan\left(90° - \frac{\theta_{LED}}{2}\right)}{\tan(90° - \theta_{LED})} > 1.$$

According to an embodiment of the present invention, the height (H) of each of the target light-emitting units is in a range from 0.5 mm to 1.5 mm.

According to an embodiment of the present invention, the optical distance (OD) is in a range from 3 mm to 10 mm.

According to the aforementioned object, a backlight module is provided. The backlight module includes a light source module and at least one optical film. The optical film is disposed on the light source module.

According to the aforementioned object, a display device is provided. The display device includes a light source module, at least one optical film and display panel. The optical film is disposed on the light source module. The display panel is disposed on the optical film.

According to the aforementioned embodiments of the present invention, the inclined angle of the sidewall of the back plate of the present disclosure is defined by the radiation angle of each of the light-emitting units. In addition, the first function and the second function are used to calculate the distance between each of the target light-emitting units and the sidewall of the back plate according to light-emitting amount and radiation angle of each of the light-emitting units. Therefore, light generated from the light-emitting units can be efficiently reflected by the sidewall of the back plate and is further emitted upwards, so that the amount of light can meet the requirements for use in the backlight module and the luminance uniformity of an area near the sidewall can be increased.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
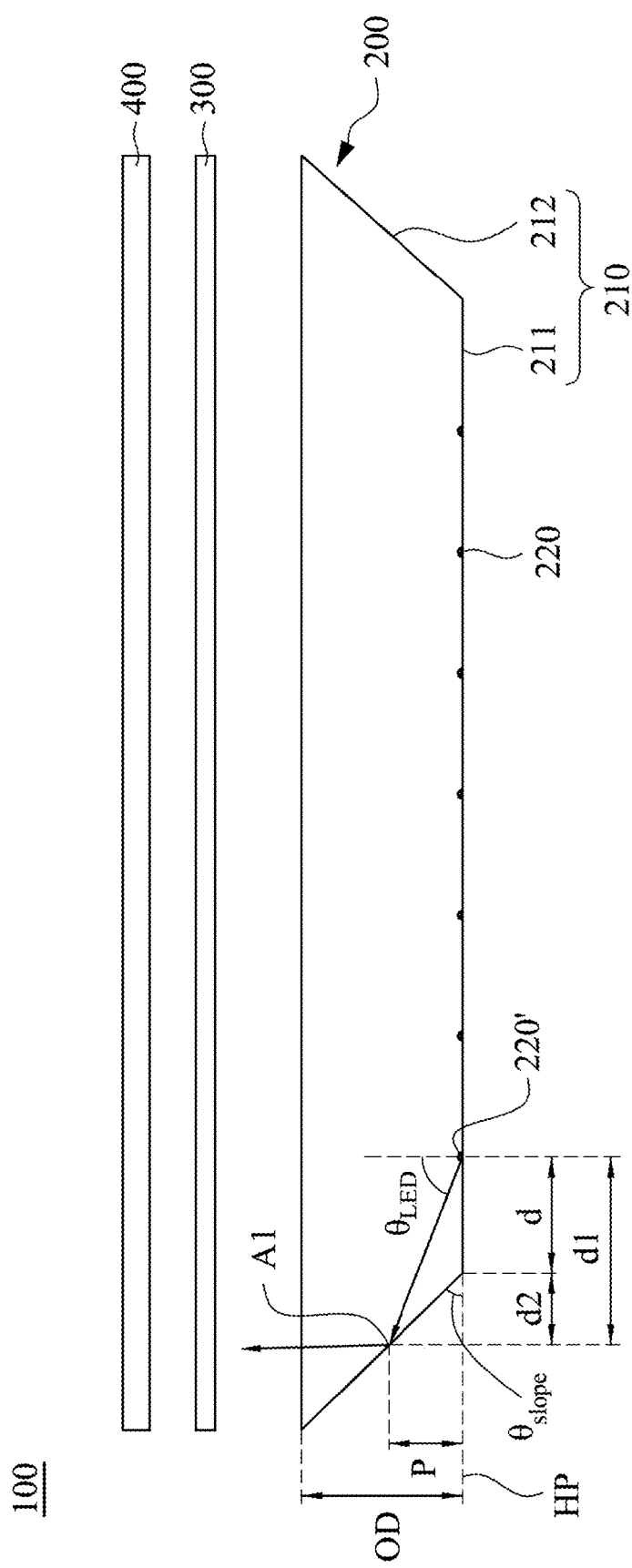
FIG. 1 is a schematic diagram showing a display device in accordance with a first embodiment of the present disclosure.

Referring to FIG. 1, FIG. 1 is a schematic diagram showing a display device 100 in accordance with a first embodiment of the present disclosure. The display device 100 mainly includes a light source module 200, at least one optical film 300 disposed on the light source module 200 and a display panel 400 disposed on the optical film 300. The light source module 200 includes a back plate 210 and plural light-emitting units 220. The back plate 210 includes a bottom plate 211 and a sidewall 212 standing on the bottom plate 211. The light-emitting units 220 are arranged in the back plate 210. Therefore, light generated by the light-emitting units 220 can be mixed by the optical film 300 to form a surface light source so as to emit out from the display panel 400. The light-emitting units 220 which are closest to the sidewall 212 are defined as target light-emitting units 220' among all the light-emitting units 220. After emitting towards the sidewall 212, light generated by the target light-emitting units 220' will be reflected by the sidewall 212 and then emit towards the optical film 300. In order to avoid too much or too little of light emitted from the edge of the sidewall 212, a distance d between each of the target light-emitting units 220' and a bottom edge of the sidewall 212 needs to be designed.

In the present embodiment, as shown in FIG. 1, the distance d between each of the target light-emitting units 220' and the bottom edge of the sidewall 212 is a difference between a first horizontal distance d1 and a second horizontal distance d2. The first horizontal distance d1 is a horizontal distance between each of the target light-emitting units 220' and a predetermined location A1 of the sidewall 212. The second horizontal distance d2 is a horizontal distance between the bottom edge of the sidewall 212 and the predetermined location A1 of the sidewall 212. In the present embodiment, the predetermined location A1 can be determined by a reflection amount of light emitted by each light-emitting unit, a half viewing angle of each light-emitting unit, or a half light-intensity angle of each light-emitting unit. The "predetermined location A1" as referred herein refers to any positions on an inclined surface of the sidewall 212, and light emitted towards the predetermined location A1 can be reflected by the sidewall 212 to be emitted from a position near a top edge of the sidewall 212. Therefore, the distance d of each of the target light-emitting units 220' and the bottom edge of sidewall 212 is designed to direct the light generated by each of the target light-emitting units 220' to the predetermined location A1. For example, the back plate 210 have a function of supporting components which are used in the light-emitting units 220 and the light source module 200, and the sidewall 212 of the back plate 210 has the function of reflecting light. Therefore, In order to improve the luminous efficiency of the overall display device, the top edge of the sidewall 212 is taken as a reference, and a portion of the surface of the sidewall 212 near the predetermined location A1 to the top edge of the sidewall 212 can reflect at least 50% (preferably more than 90%) of light generated by the light-emitting units 220 to emit upwards. Accordingly, the predetermined location A1 referred in the present disclosure can be defined as long as the required amount of reflection light can be achieved. On the other hand, in terms of utilization efficiency of the light emitted by light-emitting units, light emitted by the light-emitting units at the half viewing angles or the half light-intensity angles can be directed to the midpoint of the sidewall 212 or a position below the midpoint of the sidewall 212, and is further emitted upwards.

In some embodiments, the first horizontal distance d1 is calculated according to a first function F1, and the second horizontal distance d2 is calculated according to a second function F2. The first function F1 is determined by a tangent function of a complementary angle of a radiation angle ($\theta_{LED}$) of each of the target light-emitting units 220'. In one example, the first function F1 is defined by the following equation (1):

$$F1 = P \cdot \left(\frac{1}{\tan(90° - \theta_{LED})}\right); \quad (1)$$

wherein "P" represents a vertical distance P between a horizontal plane HP where the bottom plate 211 is located and the predetermined location A1 on the sidewall 212; $\theta_{LED}$ represents the half viewing angle or the half light-intensity angle of each of the target light-emitting units 220'. In the present embodiments, light emitted by the target light-emitting units 220' at the radiation angle $\theta_{LED}$ can emit to the predetermined location A1 of the sidewall 212.

In the present embodiment, there is an included angle $\theta_{slope}$ formed between an outer side surface of the sidewall and the horizontal plane HP where the bottom plate 211 is located, and the included angle $\theta_{slope}$ is an acute angle. In the present embodiment, and the second function F2 is determined by a tangent function of the included angle $\theta_{slope}$. In one example, the second function F2 is defined by the following equation (2):

$$F2 = P \cdot \left(\frac{1}{\tan(\theta_{slope})}\right). \quad (2)$$

On the condition that the included angle $\theta_{slope}$ between the sidewall 212 and the horizontal plane HP, the vertical distance P between the horizontal plane HP and the predetermined location A1 of the sidewall 212, and the radiation angle $\theta_{LED}$ of each of the target light-emitting units 220' are known, the distance d between each of the target light-emitting units 220' and the bottom edge of sidewall 212 can be obtained by calculating the difference between the equation (1) and the equation (2).

As shown in FIG. 1, an optical distance OD is formed between a top end of the sidewall 212 and the horizontal plane HP where the bottom plate 211 is located. The optical distance OD as referred herein refers to a light-mixing distance of the light-emitting units 220. In some embodiments, the vertical distance P in the first function F1 and the second function F2 is greater than or equal to 20% of the optical distance OD and is smaller than or equal to 50% of the optical distance OD. For example, the distance between each of the target light-emitting units 220' and the bottom edge of sidewall 212 can be determined by reflection amount of light emitted by each of the target light-emitting units, so that light emitted by the light-emitting units at the half viewing angle or the half light-intensity angle can be directed to the predetermined location A1 and further emit upwards. Therefore, light emitted by the light-emitting units should be directed to the midpoint of the sidewall 212 or the position below the midpoint of the sidewall 212. In other words, when the bottom edge of the sidewall 212 is taken as a reference, the vertical distance P is designed to be 20%-50% of the optical distance OD so as to direct the light emitted by the light-emitting units to sidewall 212.

Figure 2B:
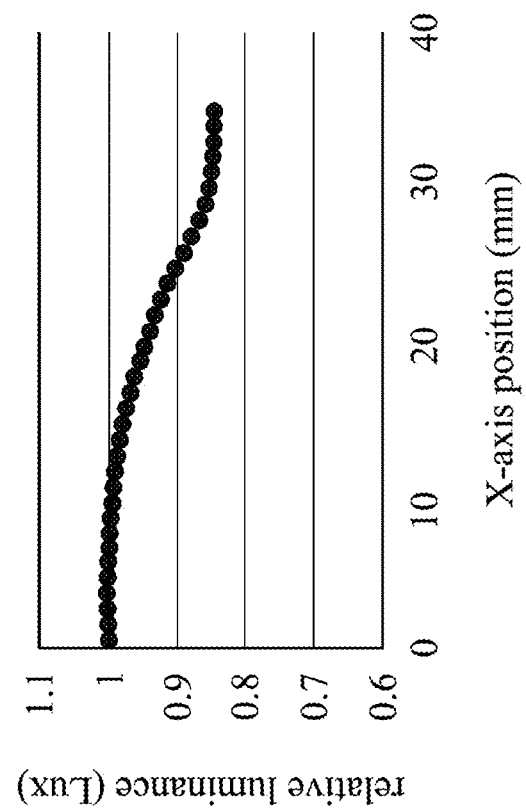
FIG. 2B is a reference curve showing a relationship between luminance of light generated according to the first embodiment and X-axis positions.
Figure 2A:
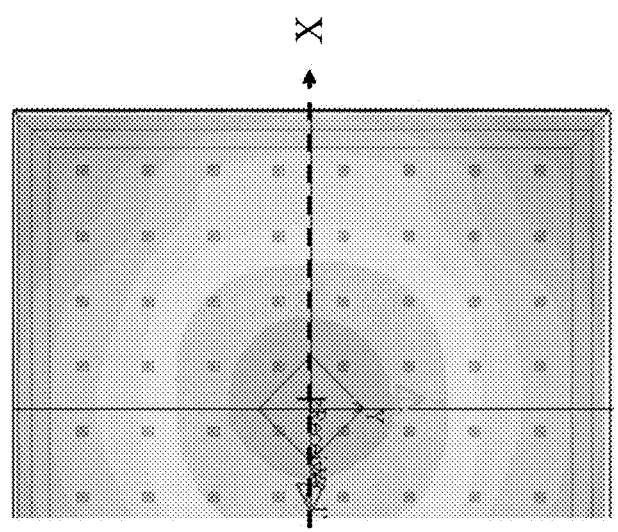
FIG. 2A is a diagram showing a simulation of optical trends for a light source module in accordance with the first embodiment of the present disclosure.

Simultaneously referring to FIG. 1, FIG. 2A and FIG. 2B, FIG. 2A is a diagram showing a simulation of optical trends for a light source module in accordance with the first embodiment of the present disclosure, and FIG. 2B is a reference curve showing a relationship between luminance of light generated according to the first embodiment and X-axis positions. It is noted that, the original photos of the optical trends simulation shown in this disclosure (for example, FIG. 2A, FIG. 4A, and FIG. 5A) are color images. When the optical trends simulation diagrams are presented in a grayscale, gray level from lighter to darker regions represents value variation of the optical trends from a small value to large value. In the first embodiment, the optical distance OD is 10 mm, the vertical distance P is 20% of the optical distance OD, the distance d between each of the target light-emitting units 220' and the bottom edge of the sidewall 212 is 1.4 mm. It can be seen from the graph in FIG. 2B that the luminance emitted from the light source module 200 near the center of the back plate 210 is smaller than the luminance emitted from the light source module 200 near the sidewall 212 of the back plate 210. In addition, the curve of brightness in FIG. 2B is a relatively smooth curve, which meets the requirements of common backlight modules.

Figure 3B:
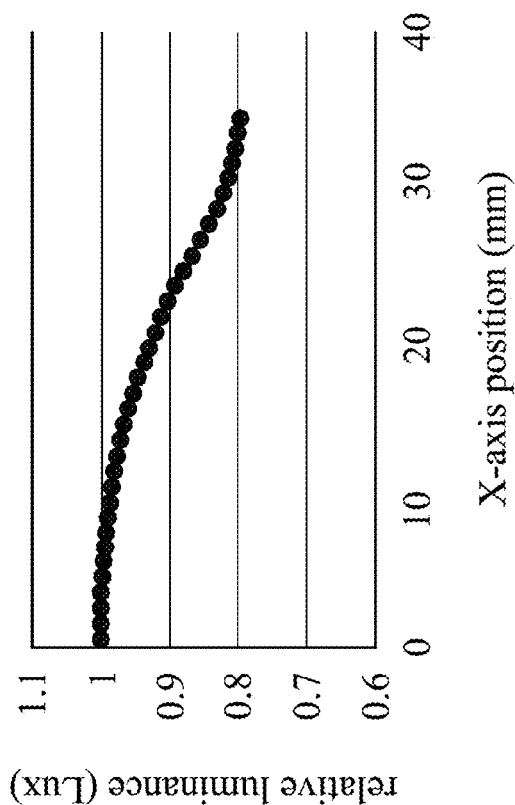
FIG. 3B is a reference curve showing a relationship between luminance of light generated according to the second embodiment and X-axis positions.
Figure 3A:
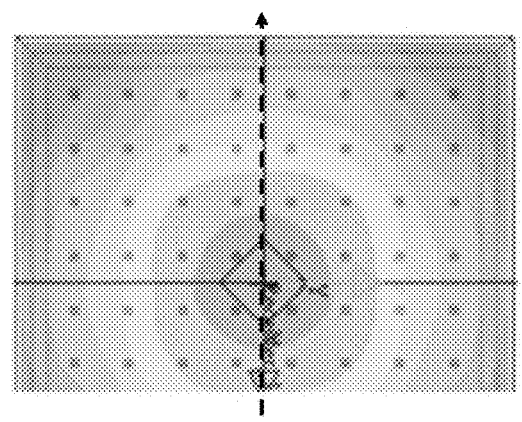
FIG. 3A is a diagram showing a simulation of optical trends for a light source module in accordance with a second embodiment of the present disclosure.

Simultaneously referring to FIG. 1, FIG. 3A and FIG. 3B, FIG. 3A is a diagram showing a simulation of optical trends for a light source module in accordance with a second embodiment of the present disclosure, and FIG. 3B is a reference curve showing a relationship between luminance of light generated according to the second embodiment and X-axis positions. In the second embodiment, the optical distance OD is 10 mm, the vertical distance P is 50% of the optical distance OD, and the distance d between each of the target light-emitting units 220' and the bottom edge of the sidewall 212 is 4.9 mm. It can be seen from the graph in FIG. 3B that the luminance emitted from the light source module 200 near the center of the back plate 210 is smaller than the luminance emitted from the light source module 200 near the sidewall 212 of the back plate 210. In addition, the curve of brightness in FIG. 3B is a relatively smooth curve, which meets the requirements of common backlight modules.

Figure 4B:
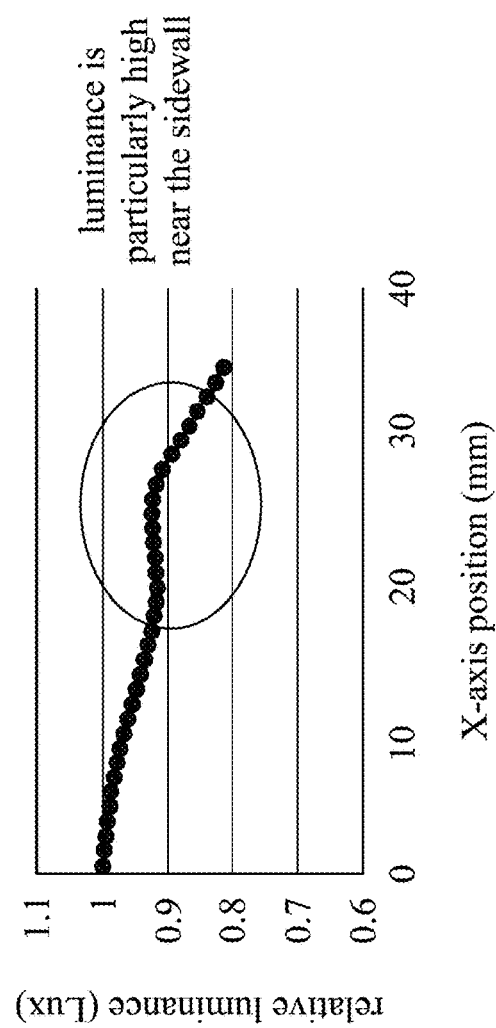
FIG. 4B is a reference curve showing a relationship between luminance of light generated according to the first comparative example and X-axis positions.
Figure 4A:
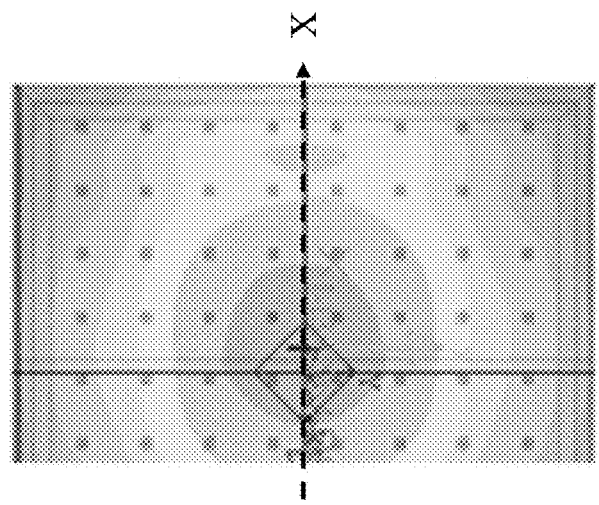
FIG. 4A is a diagram showing a simulation of for a light source module in accordance with a first comparative example.

Simultaneously referring to FIG. 1, FIG. 4A and FIG. 4B, FIG. 4A is a diagram showing a simulation of for a light source module in accordance with a first comparative example, and FIG. 4B is a reference curve showing a relationship between luminance of light generated according to the first comparative example and X-axis positions. In the first comparative example, the optical distance OD is 10 mm and the vertical distance P is 10% of the optical distance OD, the distance d between each of the target light-emitting units 220' and the bottom edge of the sidewall 212 is 0.3 mm. However, the curve of brightness in FIG. 4B shows that the luminance emitted from the light source module 200 near the sidewall 212 is particularly high, and does not meet the requirements of common backlight modules.

Figure 5B:
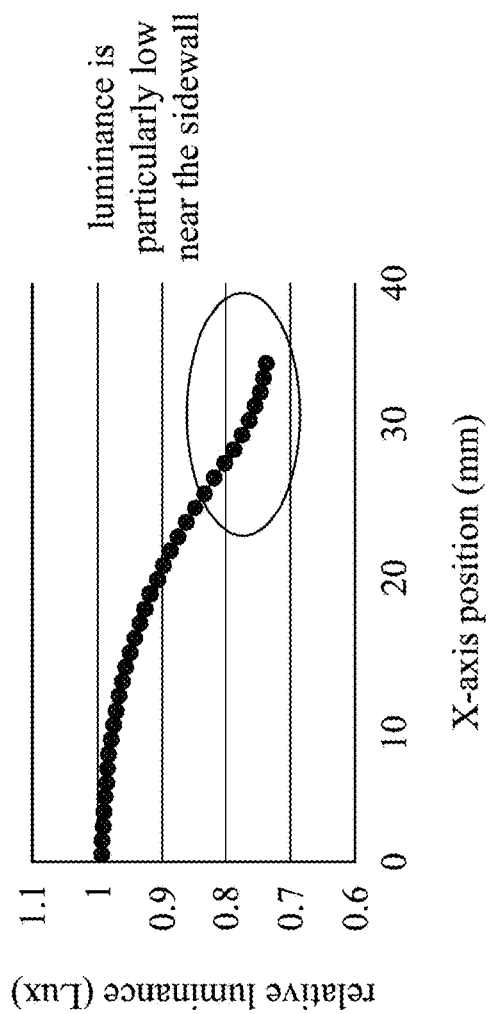
FIG. 5B is a reference curve showing a relationship between luminance of light generated according to the second comparative example and X-axis positions.
Figure 5A:
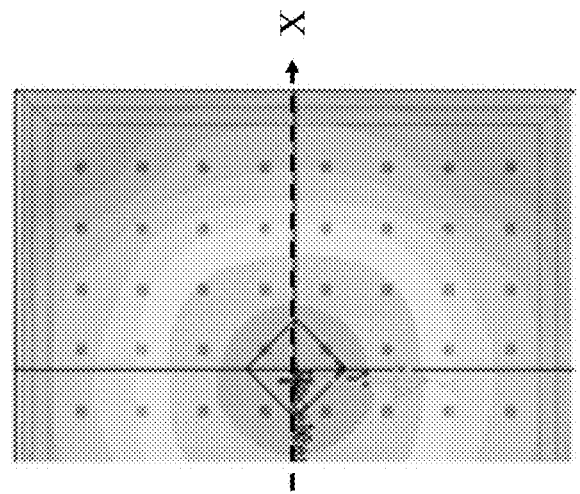
FIG. 5A is a diagram showing a simulation of optical trends for a light source module in accordance with a second comparative example.

Simultaneously referring to FIG. 1, FIG. 5A and FIG. 5B, FIG. 5A is a diagram showing a simulation of optical trends for a light source module in accordance with a second comparative example, and FIG. 5B is a reference curve showing a relationship between luminance of light generated according to the second comparative example and X-axis positions. In the second comparative example, the optical distance OD is 10 mm and the vertical distance P is 80% of the optical distance OD, the distance d between each of the target light-emitting units 220' and the bottom edge of the sidewall 212 is 6.1 mm. However, the curve of brightness in FIG. 5B shows that the luminance emitted from the light source module 200 near the sidewall 212 is particularly low, and does not meet the requirements of common backlight modules. Accordingly, by designing the vertical distance P of light-emitting units 220 from the predetermined location A1 to the bottom edge of the sidewall 212 to be greater than or equal to 20% of the optical distance OD and to be smaller than or equal to 50% of the optical distance OD, the light source module has improved luminance uniformity. In some examples, the optical distance OD is in a range from 3 mm to 10 mm.

Referring to FIG. 1 again, in one embodiment, the included angle $\theta_{slope}$ is formed between the sidewall 212 and the horizontal plane HP. The relationship between the included angle $\theta_{slope}$ and the radiation angle $\theta_{LED}$ of each of the target light-emitting units 220' can be defined by an equation (3) or an equation (4):

$$(90 - \theta LED) < \theta slope \leq 90; \tag{3}$$

$$\theta_{slope} = \frac{(180° - \theta_{LED})}{2}. \tag{4}$$

Therefore, on the condition that the radiation angle $\theta_{LED}$ is known, the included angle $\theta_{slope}$ of the sidewall 212 can be calculated by using the equation (3) and the equation (4).

Figure 6:
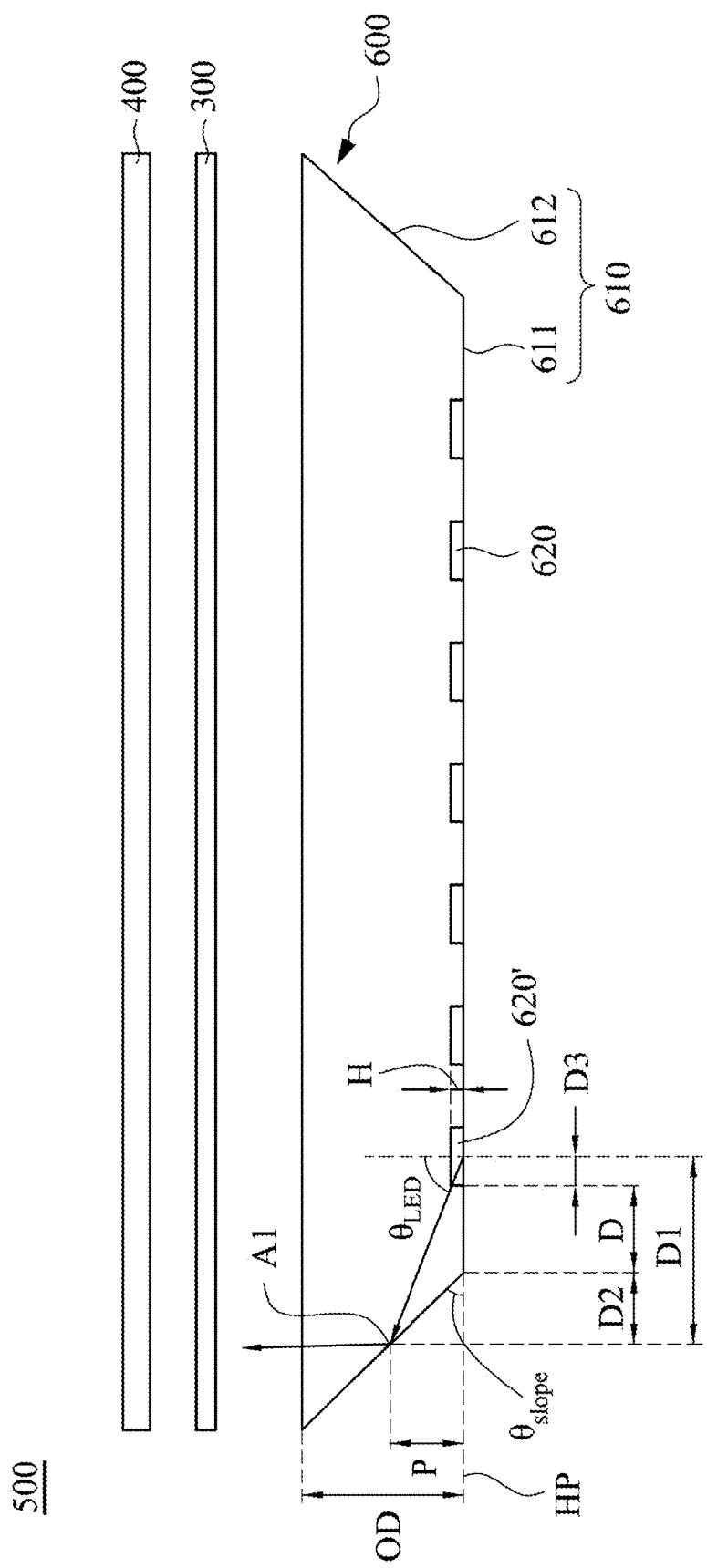
FIG. 6 is a schematic diagram showing a display device in accordance with a second embodiment of the present disclosure.

It is noted that, it is assumed that the light-emitting units 220 in the light source module 200 shown in FIG. 1 are point light sources, so there is no need to consider the heights of the light-emitting units 220. In other embodiments, light-emitting units having heights also can be applied to the light source module. Referring to FIG. 6, FIG. 6 is a schematic diagram showing a display device 500 in accordance with a second embodiment of the present disclosure. The structure of the display device 500 shown in FIG. 6 is similar to that of the display device 100 shown in FIG. 1, and the main difference therebetween is that a light source module 600 of the display device 500 has different designs. The light source module 600 shown in FIG. 6 mainly includes a back plate 610 and plural light-emitting units 620. The back plate 610 includes a bottom plate 611 and a sidewall 612 standing on the bottom plate 611, and the light-emitting units 620 are arranged in the back plate 610. Therefore, light generated by the light-emitting units 620 can be mixed by the optical film 300 to form a surface light source to emit out from the display panel 400. The light-emitting units 620 which are closest to the sidewall 612 are defined as target light-emitting units 620' among the light-emitting units 620. There is a distance D between each of the target light-emitting units 620' and a bottom edge of the sidewall 612.

As shown in FIG. 6, in the present embodiment, the distance D is calculated by subtracting a third horizontal distance D3 from a difference between the first horizontal distance D1 and the second horizontal distance D2. The first horizontal distance D1 is a horizontal distance between each of the target light-emitting units 620' and a predetermined location A1 on the sidewall 612. The second horizontal distance D2 is a horizontal distance between the bottom edge of the sidewall 612 and the predetermined location A1 on the sidewall 612. The third horizontal distance D3 is a distance between a center and a side edge of each of the target light-emitting units 620'. In other words, in a case of each of the light-emitting units 620' having a height H, the height H of each of the light-emitting units 620' has to be considered while calculating the distance D between each of the target light-emitting units 620' and the bottom edge of the sidewall 212. In one embodiment, the first horizontal distance D1 is calculated according to the aforementioned first function F1, and the first function F1 is defined by the aforementioned equation (1). In addition, the second horizontal distance D2 is calculated according to the aforementioned first function F2, and the first function F2 is defined by the aforementioned equation (2). In the equation (1), "P" represents a vertical distance P between a horizontal plane HP where the bottom plate 611 is located and the predetermined location A1 of the sidewall 612, and "$\theta_{LED}$" represents a radiation angle of each of the target light-emitting units 620', for example, the half viewing angle or the half light-intensity angle of each of the target light-emitting units 620'. In the equation (2), "$\theta_{slope}$" represents an included angle formed between an outer side surface of the sidewall 612 and the horizontal plane HP where the bottom plate 611 is located.

As shown in FIG. 6, the third horizontal distance D3 is a distance between the center and the side edge of each of the target light-emitting units 620'. In one example, the third horizontal distance D3 is half the width of each of the target light-emitting units 620'. The third horizontal distance D3 is calculated according to a third function F3. The third function F3 is determined by a tangent function of a complementary angle of a radiation angle $\theta_{LED}$ of each of the target light-emitting units 620'. In one example, the third function F3 is defined by the following equation (5):

$$F3 = \frac{H}{\tan(90° - \theta_{LED})}; \tag{5}$$

wherein "H" in the equation (5) represents the height H of each of the target light-emitting units 620'. In some embodiments, the height H is in a range from 0.5 mm to 1.5 mm.

As shown in FIG. 6, an optical distance OD is formed between a top end of the sidewall 612 and the horizontal plane HP where the bottom plate 611 is located. In some embodiments, the relationship among the height H of each of the target light-emitting units 620', the optical distance between the top end of the sidewall 612 and the horizontal plane HP where the bottom plate 611, the included angle $\theta_{slope}$ between the outer side surface of the sidewall 612 and the horizontal plane HP where the bottom plate 611 is located, and the radiation angle $\theta_{LED}$ of each of the target light-emitting units 620' can be defined by an inequality (6) or an inequality (7):

$$\left(1 - \frac{2H}{OD}\right) \cdot \frac{\tan(\theta_{slope})}{\tan(90° - \theta_{LED})} > 1; \tag{6}$$

$$\left(1 - \frac{2H}{OD}\right) \cdot \frac{\tan\left(90° - \frac{\theta_{LED}}{2}\right)}{\tan(90° - \theta_{LED})} > 1. \tag{7}$$

Simultaneously referring to Table 1 and FIG. 6, Table 1 shows the relationship between the optical distance OD and the distance D which is formed between each of the target light-emitting units 620' and the bottom edge of sidewall 612 when the radiation angle $\theta_{LED}$ of each of the target light-emitting units 620' is 60 degrees, the height H of each of the target light-emitting units 620' is 0.5 mm, the included angle $\theta_{slope}$ between the outer side surface of the sidewall 612 and the horizontal plane HP is 60 degrees.

TABLE 1

| | optical distance OD (mm) | | | | | | | |
|---|---|---|---|---|---|---|---|---|
| | 3 | 4 | 5 | 6 | 7 | 8 | 9 | 10 |
| distance D (mm) | 0.87 | 1.44 | 2.02 | 2.60 | 3.18 | 3.75 | 4.33 | 4.91 |

Simultaneously referring to Table 2 and FIG. 6, Table 2 shows the relationship between the optical distance OD and the distance D which is formed between each of the target light-emitting units 620' and the bottom edge of sidewall 612 when the radiation angle $\theta_{LED}$ of each of the target light-emitting units 620' is 60 degrees, the height H of each of the target light-emitting units 620' is 0.2 mm, the included angle $\theta_{slope}$ between the outer side surface of the sidewall 612 and the horizontal plane HP is 60 degrees.

TABLE 2

| | optical distance OD (mm) | | | | | | | |
|---|---|---|---|---|---|---|---|---|
| | 3 | 4 | 5 | 6 | 7 | 8 | 9 | 10 |
| distance D (mm) | 1.39 | 1.96 | 2.54 | 3.12 | 3.70 | 4.27 | 4.85 | 5.43 |

Simultaneously referring to Table 3 and FIG. 6, Table 3 shows the relationship between the optical distance OD and the distance D which is formed between each of the target light-emitting units 620' and the bottom edge of sidewall 612 when the radiation angle $\theta_{LED}$ of each of the target light-emitting units 620' is 75 degrees, the height H of each of the target light-emitting units 620' is 0.5 mm, the included angle $\theta_{slope}$ between the outer side surface of the sidewall 612 and the horizontal plane HP is 52.5 degrees.

TABLE 3

| | optical distance OD (mm) | | | | | | | |
|---|---|---|---|---|---|---|---|---|
| | 3 | 4 | 5 | 6 | 7 | 8 | 9 | 10 |
| distance D (mm) | 2.58 | 4.06 | 5.55 | 7.03 | 8.51 | 9.99 | 11.48 | 12.96 |

Simultaneously referring to Table 4 and FIG. 6, Table 4 shows the relationship between the optical distance OD and the distance D which is formed between each of the target light-emitting units 620' and the bottom edge of sidewall 612 when the radiation angle $\theta_{LED}$ of each of the target light-emitting units 620' is 75 degrees, the height H of each of the target light-emitting units 620' is 1 mm, the included angle $\theta_{slope}$ between the outer side surface of the sidewall 612 and the horizontal plane HP is 52.5 degrees.

TABLE 4

| | optical distance OD (mm) | | | | | | | |
|---|---|---|---|---|---|---|---|---|
| | 3 | 4 | 5 | 6 | 7 | 8 | 9 | 10 |
| distance D (mm) | 0.72 | 2.20 | 3.68 | 5.16 | 6.64 | 8.13 | 9.61 | 11.09 |

From Tables 1-4, on the condition that the included angle $\theta_{slope}$ between the sidewall 612 and the horizontal plane HP, the radiation angle $\theta_{LED}$ of each of the target light-emitting units 620', the height H of each of the target light-emitting units 620' and the optical distance OD between the top end of the sidewall 612 and the horizontal plane HP where the bottom plate 611 is located are known, the distance D between each of the target light-emitting units 620' and the bottom edge of the sidewall 612 can be calculated by using the equation (1), equation (2) and the equation (5).

According to the aforementioned embodiments of the present invention, the inclined angle of the sidewall of the back plate of the present disclosure is defined by the radiation angle of each of the light-emitting units. In addition, the first function and the second function are used to calculate the distance between each of the target light-emitting units and the sidewall of the back plate according to light-emitting amount and radiation angle of each of the light-emitting units. Therefore, light generated from the light-emitting units can be efficiently reflected by the sidewall of the back plate and is further emitted upwards, so that the amount of light can meet the requirements for use in the backlight module and the luminance uniformity of an area near the sidewall can be increased.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light source module, comprising:
   a back plate, comprising a bottom plate and a sidewall standing on the bottom plate, wherein an included angle ($\theta_{slope}$) is formed between an outer side surface of the sidewall and a horizontal plane where the bottom plate is located, and the included angle is an acute angle, and an optical distance (OD) is defined between a top end of the sidewall and the horizontal plane;

a plurality of light-emitting units arranged in the back plate, wherein the light-emitting units which are closest to the sidewall are defined as a plurality of target light-emitting units, and each of the target light-emitting units has a radiation angle ($\theta_{LED}$), and each of the target light-emitting units is separated from the sidewall by a distance (d);

wherein the distance (d) is a difference between a first horizontal distance and a second horizontal distance, and the first horizontal distance is formed between each of the target light-emitting units and a predetermined location of the sidewall, and the second horizontal distance is formed between a bottom edge of the sidewall and the predetermined location of the sidewall;

wherein the first horizontal distance is calculated according to a first function F1, and the first function F1 is determined by a tangent function of a complementary angle of the radiation angle ($\theta_{LED}$), the second horizontal distance is calculated according to a second function F2, and the second function F2 is determined by a tangent function of the included angle ($\theta_{slope}$);

wherein the first function F1 is defined by the following equation:

$$F1 = P \cdot \left( \frac{1}{\tan(90° - \theta_{LED})} \right);$$

the second function F2 is defined by the following equation:

$$F2 = P \cdot \left( \frac{1}{\tan(\theta_{slope})} \right);$$

wherein "P" represents a vertical distance between the horizontal plane and the predetermined location on the sidewall;

wherein the radiation angle ($\theta_{LED}$) is a half viewing angle or a half light-intensity angle of each of the target light-emitting units, and light emitted by each of the target light-emitting units at the radiation angle ($\theta_{LED}$) is directed to the predetermined location of the sidewall;

wherein a vertical distance P between the horizontal plane and the predetermined location on the sidewall is greater than or equal to 20% of the optical distance (OD) and is smaller than or equal to 50% of the optical distance (OD).

2. The light source module of claim 1, wherein a portion of a surface of the sidewall which ranges from the predetermined location to a top edge of the sidewall reflects more than 50% of light generated by each of the target light-emitting units.

3. The light source module of claim 1, wherein the predetermined location is a midpoint of the sidewall or a position lower than the midpoint of the sidewall to which the light emitted by each of the target light-emitting units at half viewing angle or a half light-intensity angle is able to reach.

4. The light source module of claim 1, wherein the relationship between the included angle ($\theta_{slope}$) and the radiation angle ($\theta_{LED}$) is defined by an inequality: $(90-\theta_{LED}) < \theta_{slope} \leq 90$.

5. The light source module of claim 1, wherein the relationship between the included angle ($\theta_{slope}$) and the radiation angle ($\theta_{LED}$), is defined by an equation:

$$\theta_{slope} = \frac{(180° - \theta_{LED})}{2}.$$

6. The light source module of claim 1, wherein a distance (D) is calculated by subtracting a third horizontal distance from the difference between the first horizontal distance and the second horizontal distance; and the third horizontal distance is a distance between a center and an edge of each of the target light-emitting units, wherein the third horizontal distance is calculated according to a third function F3, and the third function F3 is determined by a tangent function of a complementary angle of the radiation angle ($\theta_{LED}$);

wherein the third function F3 is defined by the following equation:

$$F3 = \frac{H}{\tan(90° - \theta_{LED})};$$

wherein "H" represents a height of each of the target light-emitting units.

7. The light source module of claim 6, wherein the relationship among the height (H) of each of the target light-emitting units, the optical distance (OD), the included angle ($\theta_{slope}$) and the radiation angle ($\theta_{LED}$) is defined by an inequality:

$$\left(1 - \frac{2H}{OD}\right) \cdot \frac{\tan(\theta_{slope})}{\tan(90° - \theta_{LED})} > 1.$$

8. The light source module of claim 6, wherein the relationship among the height (H) of each of the target light-emitting units, the optical distance (OD), the included angle ($\theta_{slope}$) and the radiation angle ($\theta_{LED}$) is defined by an inequality:

$$\left(1 - \frac{2H}{OD}\right) \cdot \frac{\tan\left(90° - \frac{\theta_{LED}}{2}\right)}{\tan(90° - \theta_{LED})} > 1.$$

9. The light source module of claim 6, wherein the height (H) of each of the target light-emitting units is in a range from 0.5 mm to 1.5 mm.

10. The light source module of claim 1, wherein the optical distance (OD) is in a range from 3 mm to 10 mm.

11. A backlight module, comprising:

a light source module of claim 1; and at least one optical film disposed on the light source module.

12. A display device, comprising:
a light source module of claim 1;
at least one optical film disposed on the light source module; and
a display panel disposed on the optical film.

* * * * *